United States Patent [19]

Clapp

[11] Patent Number: 6,115,518
[45] Date of Patent: Sep. 5, 2000

[54] OPTICAL WAVEGUIDE BRAGG REFLECTION GRATINGS

[75] Inventor: Terry Victor Clapp, Standon, United Kingdom

[73] Assignee: Nortel Networks Corporation, Montreal, Canada

[21] Appl. No.: 08/896,092

[22] Filed: Jul. 17, 1997

[30] Foreign Application Priority Data

Aug. 10, 1996 [GB] United Kingdom .................. 9616839

[51] Int. Cl.$^7$ ...................................................... G02B 6/34
[52] U.S. Cl. ................................................................ 385/37
[58] Field of Search ................................ 385/10, 14, 37; 359/288, 566, 569, 570; 333/147, 153

[56] References Cited

U.S. PATENT DOCUMENTS

| 4,262,996 | 4/1981 | Yao et al. . | |
| 4,419,637 | 12/1983 | Volluet et al. | 333/147 |
| 4,906,063 | 3/1990 | Sato et al. | 385/37 |
| 4,963,177 | 10/1990 | Najafi et al. | 65/30.13 |
| 5,080,503 | 1/1992 | Najafi et al. | 385/1 |
| 5,195,161 | 3/1993 | Adar et al. | 385/129 |
| 5,459,799 | 10/1995 | Weber | 385/2 |
| 5,581,639 | 12/1996 | Davies et al. | 385/10 |
| 5,710,849 | 1/1998 | Little et al. | 385/50 |

FOREIGN PATENT DOCUMENTS 63-106605  10/1988  Japan .

*Primary Examiner*—Akm E. Ullah
*Attorney, Agent, or Firm*—Lee, Mann, Smith, McWilliams, Sweeney & Ohlson

[57] ABSTRACT

An optical waveguide Bragg grating spectrally selective reflector is made by ion beam implantation through a photolithographic mask to raise locally the effective refractive index of the guide. This contrasts with the standard method, which uses UV light to raise the index through the agency of the photo-refractive effect.

8 Claims, 2 Drawing Sheets

OPTICAL WAVEGUIDE BRAGG REFLECTION GRATINGS

BACKGROUND OF THE INVENTION

This invention relates to the provision of spectrally selective reflectors in optical waveguides, particularly reflectors of the Bragg grating type. It is known to create such gratings in optical fibre by lateral irradiation of such a fibre with a fringe pattern of relatively high intensity ultra-violet light, relying upon the photorefractive effect to cause that light to induce a corresponding pattern of localised refractive index change. The construction of a spectrally selective reflector to conform reasonably closely to a desired spectral profile requires correspondingly close control over absolute local refractive index values, apodisation and uniformity across the waveguide. This is difficult to achieve in using the photorefractive effect to write a Bragg grating in an optical fibre by the lateral illumination method referred to above. This is partly because the grating has to be written in the optical core through the cladding, and partly because the photorefractive effect is not easy to harness in the material system being used.

For the manufacture of spectrally selective reflectors in optical waveguides that are not optical fibre waveguides, a number of techniques have been proposed which involve applying a layer of mask material to the core of the waveguide, patterning this material to provide a set of windows for modifying the underlying core by selective ion exchange diffusion of a refractive index modifying dopant through the windows, or by selective etching through the windows to form trenches which are then infilled with lower refractive index material.

The etch and infill approach is for instance described in U.S. Pat. No. 5 195 161, which briefly alludes to photolithographic masking preparatory for etching a series of recessed features (trenches) by reactive ion etching, and then infilling them with material of lower refractive index. A similar infilling approach appears to be described also in the abstract of JP 63-106605 A appearing in Patent Abstracts of Japan, vol. 12, no. 354 (P-761), though the abstract does not specifically identify the grooves as being formed by ion etching. The ion exchange diffusion approach is for instance described in U.S. Pat. No. 5 080 503, which describes depositing a film of masking material upon a substrate in which a waveguide has been formed, opening windows in the mask material and then immersing the masked substrate in a bath of molten salt to induce ion exchange through the windows in the mask. Additionally, though not specifically in the context of Bragg reflective gratings in optical waveguides, but instead in the context of Bragg diffractive gratings in optical waveguides, U.S. Pat. No. 4 262 996 briefly states that, in the preferred embodiment, the index modulation providing the grating structure is accomplished on the surface of the optical waveguide by corrugation or etching (chemical, plasma, ion beam, etc.), by overlay, or by diffusion of dopants into the material of the optical waveguide.

For the creation of optical waveguide Bragg reflection gratings, the etch and infill approach, also the ion exchange diffusion approach, and diffusion, are all unattractive compared with the photorefractive effect approach in relation to the definition and control attainable having regard to the fact that the pitch of such a grating is liable to be only about 500 nm.

SUMMARY OF THE INVENTION

The present invention is directed to circumvention of these problems resulting from the above-described use not only of the photorefractive effect to create Bragg gratings in optical fibres, but also of the etch and infill and of the ion exchange methods of creating Bragg gratings in optical waveguides.

According to the present invention there is provided an optical waveguide having a rib of core glass supported on a layer of lower refractive index cladding glass, in which core glass rib is formed by selective ion implantation a set of localised regions of raised refractive index co-operating to constitute a Bragg reflection grating.

The invention also provides a method of creating an optical waveguide provided with a Bragg reflective grating, which method includes the steps of, forming a layer of core glass on a layer of lower refractive index cladding glass, providing a set of localised regions of raised refractive index in the layer of core glass by selective ion implantation, and selectively removing area of the core glass layer to produce a strip waveguiding structure containing said set of localised regions.

The degree of resolution attainable when creating Bragg gratings by etch and infill, by ion exchange, or by diffusion is limited at least in part by the lithographic techniques employed to pattern the respective masks. Lithography is also employed in mask pattering for the creation of Bragg gratings by ion implantation, and so upon a superficial view it might be thought that similar resolution ought to be equally easily attainable by each one of these three Bragg grating creation techniques. Upon a more detailed examination of the processing involved, it can be ascertained that higher resolution is more readily attainable when using ion implantation. This becomes apparent upon consideration of the nature of the processing involved in each instance. In the case of ion implantation no masking layer is involved other than the layer of resist, and all that is required of this resist is first that it be capable of being patterned to form windows, and second that the portions between the windows are substantial enough to trap the ions used for implantation through the windows. These requirements are readily satisfied by simple high resolution photoresists and E-beam resists. In the case of ion beam etching, the resist layer has to be capable of being patterned and additionally has to be capable itself of withstanding the ion etching, or it has to be used in conjunction with a second masking layer that can withstand the ion etching. In both instances the extra requirements are liable to involve degradation of the achievable resolution in the finished product. A further problem is that associated with the occurrence of undercutting during the etching processing, and then there is the additional problem associated with changes of profile liable to occur during the subsequent infilling processing, and with the possibility of unintentional void formation during the infilling. In the case of diffusion or ion exchange diffusion, the processing conditions under which diffusion occurs are liable to be much too aggressive for a simple resist layer to withstand, and so the patterned resist has to be used in its turn for patterning and underlying layer of mask material Additional to the resolution degradation that this entails, there are the problems of diffusion spreading laterally under the mask boundaries and the problems of mask removal after the diffusion has been completed without further degradation of the pattern. Moreover the dose that can be supplied in an ion doping process is liable to be more readily controllable with a relatively high degree of precision than the corresponding dose supplied in a diffusion operation.

Ion implantation of phosphorus, of germanium, and of boron ions are known procedures in semiconductor technology, and such dopants are also eminently suitable as dopants for waveguide refractive index control Implant doses of up to $10^{20}$ ions m$^{-2}$ are achievable at energies that will give approximately Gaussian doping profiles buried by the order of 50 to 100 nm. Under these conditions it is convenient to construct the core in two parts, creating the regions of increased refractive index in the upper surfaces of the lower part, and then covering that lower part with the upper part, so that the regions of increased refractive index lie on or close to the mid-plane of the core. This has the advantage that the refractive index can then be modulated in a region where the field of the fundamental guided mode is strongest while that of the next higher order mode low, and thus the modulation interacts much more strongly with the fundamental mode. Subsequent to the ion implantation, the guide may be annealed to modify the concentration profile by diffusion effects if this is desired. Apodisation of the grating can readily be effected by grading the pitch of the regions of increased refractive index, their width, or their length in the axial direction of the waveguide, or a combination of any of these three factors. The orientation of the regions may be chosen such that they co-operate to form a blazed grating.

BRIEF DESCRIPTION OF THE DRAWINGS

There follows a description of the manufacture of an optical waveguide provided with a Bragg reflective grating embodying the invention in a preferred form. The description refers to the accompanying drawings in which.

DETAILED DESCRIPTION OF PREFERRED EMBODIMENTS

Figure 1:
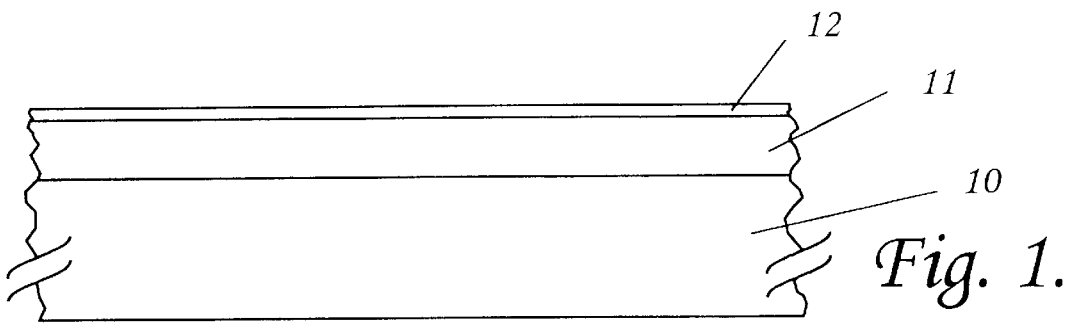
FIGS. 1 to 4 depict, in schematic longitudinal section, successive stages in the creation of the waveguide and its Bragg grating.
Figure 2:
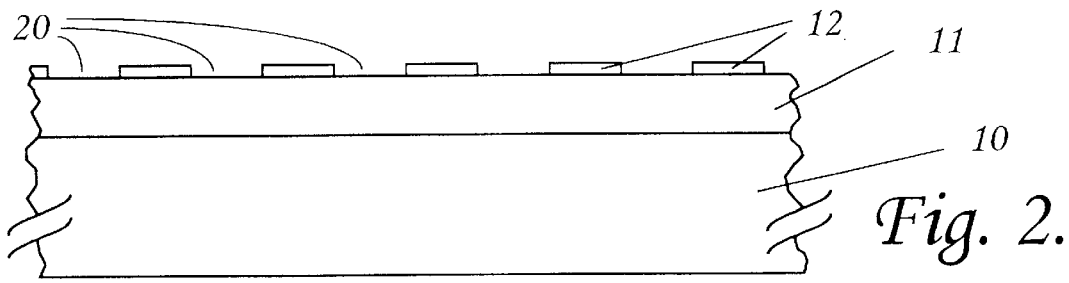
Figure 3:
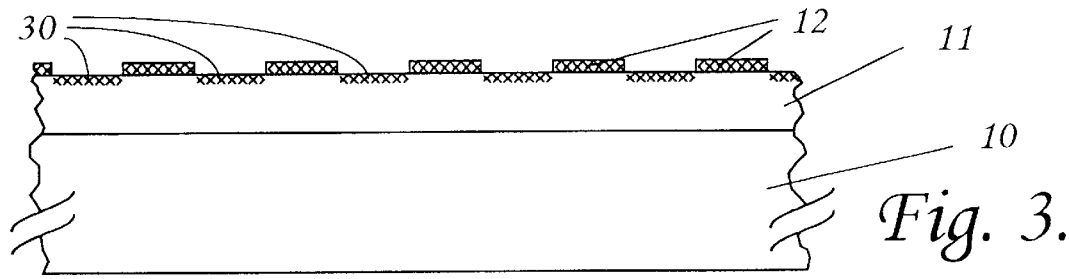
Figure 4:
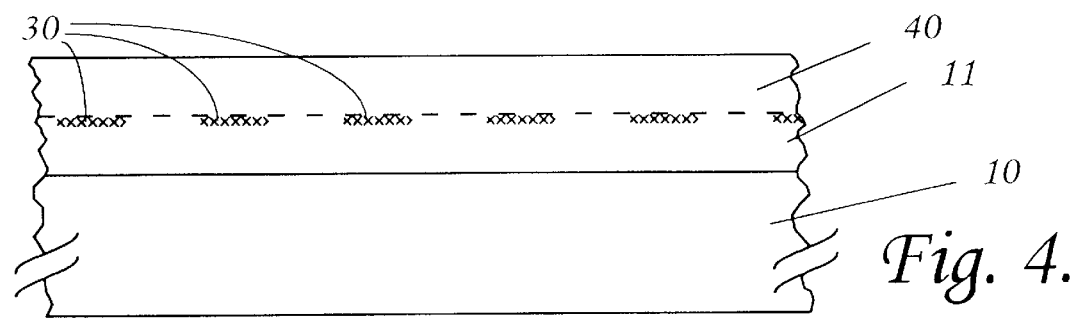
Figure 5:
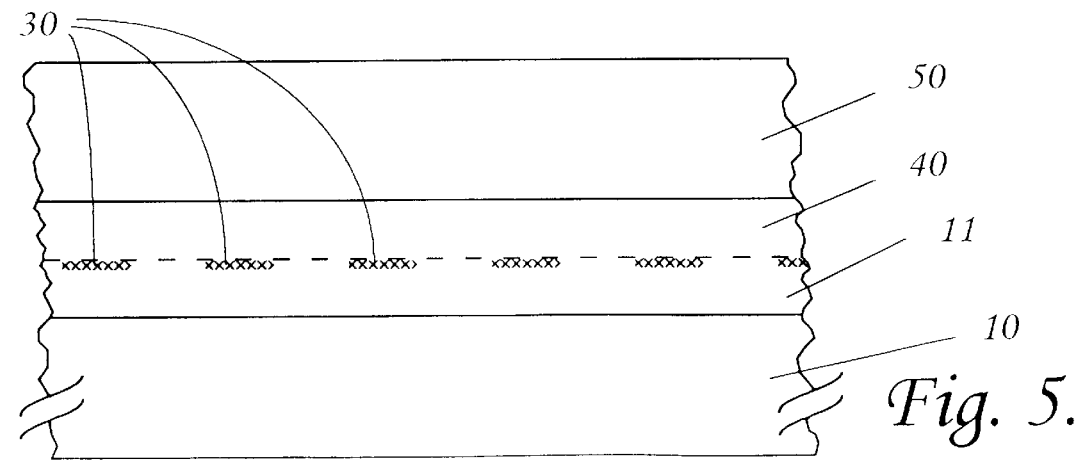
FIG. 5 and 6 depict, respectively in schematic plan and transverse sectional view a portion of the completed waveguide grating.
Figure 6:
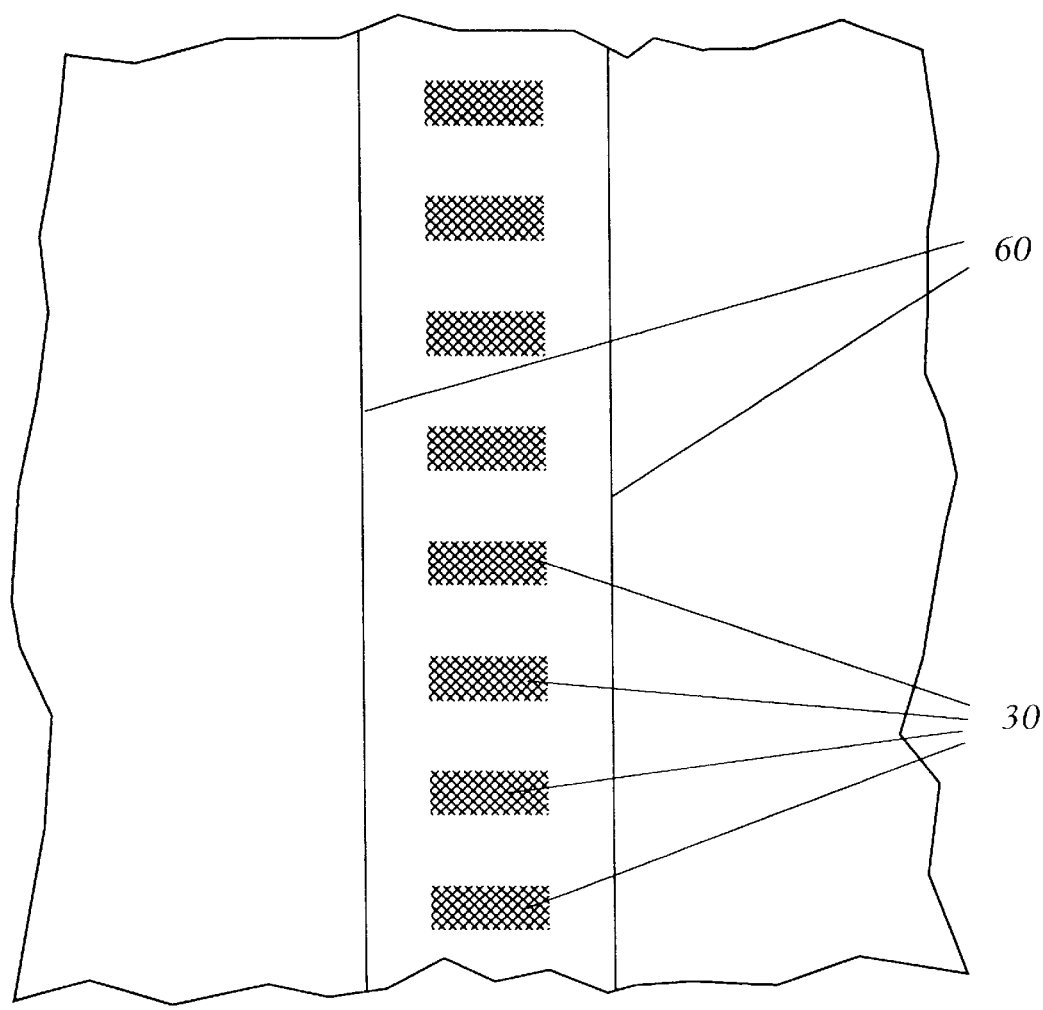
Figure 7:
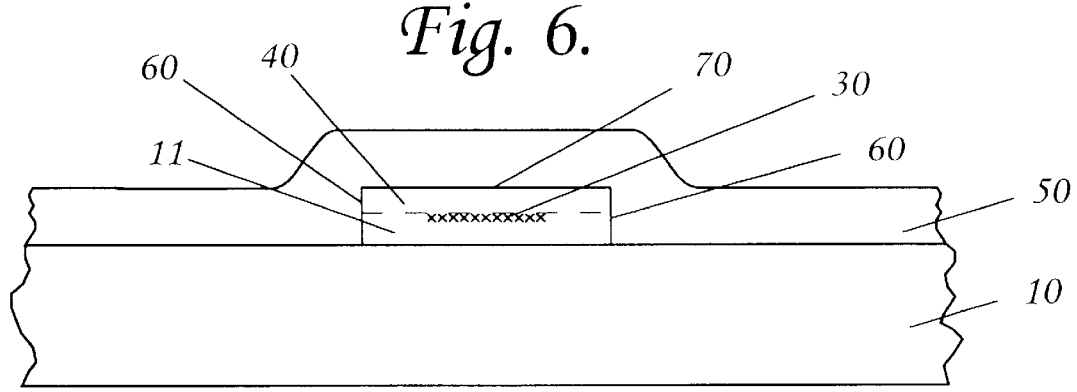

Referring to the accompanying drawings, upon a layer 10 of cladding glass, typically of fused silica which may be of a layer of silica grown upon a silicon substrate (not shown) or a free-standing substrate of silica, is grown for instance by plasma enhanced chemical vapour deposition (PECVD), a layer 11 of core glass having a refractive index greater than that of the underlying cladding layer 10. This core layer is typically a layer about 2.5 to 3.0 $\mu$m thick of silica doped with germanium, boron and phosphorous in proportions to raise its refractive index by about 0.01 above that of the underlying cladding glass layer 10. Next, the core glass layer 11 is coated with a layer 12 of photolithographic resist which is patterned to open a line of substantially rectangular windows 20 (FIG. 2) on a pitch typically lying in the region of about 500 nm, and each typically having a width of between 1 to 4 $\mu$m. The resist-coated surface is then raster scanned in the vicinity of the windows 30 with an ion beam conveniently of phosphorus or germanium at an energy of about 340 MeV to give a dosage of about $10^{19}$–$10^{20}$ ions m$^{-2}$. Where these ions strike the photoresist, they are absorbed by it; but in the windows in the resist, the ions come to rest in regions 30 (FIG. 4) centred a short distance below the exposed surface of the core glass layer 11. The core glass layer 11 is then coated with a further layer 40 (FIG. 4) of core glass. Both core glass layers preferably have the same refractive index, and are typically of the same composition, deposited in the same manner, and of substantially equal thickness. Next a fresh masking layer (not shown) is applied to core glass layer 40, and is patterned preparatory for removal of areas of the core glass layers so as to leave side walls 60 (FIG. 6) defining a rib 70 FIG. 7 of residual core glass containing the set of regions 30 where the refractive index has been raised by ion implantation, these regions 30 extending transversely in a row along the central axis of the rib 70. The unwanted areas of the core glass layers may conveniently be removed by reactive ion etching so as to leave relatively straight and square-sided walls 60. Finally an upper cladding glass layer 50 (FIG. 5) is deposited to cover the exposed top and side surfaces of the rib 60. This upper cladding glass layer 50 has a lower refractive index than that of the two core glass layers. It may be deposited in the same way as the core glass layers, and preferably is a layer of doped silica so as to have a lower softening temperature than that of undoped silica so as to minimise the risk of its deposition causing distortion of the underlying rib 60. The dopants may include germanium and/or phosphorous together with an index reducing dopant such as boron and/or fluorine.

A particular feature of the Bragg reflector gratings formed in this way is that the areas of the individual windows 20 are quite large compared with that of small windows currently employed in semiconductor devices processing that measure only 100 nm×100 nm. This means that the technology affords the sensitivity necessary for achieving a relatively precise progressive grading of the areas of a set of windows to provide good control of grating apodisation when required. Ion implantation at a single value of ions per unit area can thus, by a grading of window area, provide a relatively wide range of effective refractive index enhancement. This range can be extended, if required, by the use of multiple implants.

What is claimed:

1. An optical waveguide having a rib of core glass supported on a layer of lower refractive index cladding glass, in which core glass rib is formed by selective ion implantation a set of localised regions of raised refractive index co-operating to constitute a Bragg reflection grating.

2. An optical waveguide as claimed in claim 1, wherein the Implanted ions comprise ions of phosphorus or germanium.

3. An optical waveguide as claimed in claim 1, wherein the rib is covered with a further layer of cladding glass having a refractive index lower than that of the core glass.

4. An optical waveguide as claimed in claim 3, wherein the Implanted ions comprise ions of phosphorus or germanium.

5. A method of creating an optical waveguide provided with a Bragg reflective grating, which method includes the steps of, forming a layer of core glass on a layer of lower refractive index cladding glass, providing a set of localised regions of raised refractive index in the layer of core glass by selective ion implantation, and selectively removing areas of the core glass layer to produce a strip waveguiding structure containing said set of localised regions.

6. A method as claimed in claim 5, wherein, after the step of selectively removing said areas of the core glass layer, there is included the step of covering the remaining region of the core glass layer that contains the set of localised regions of raised refractive index with a further layer of cladding glass possessing a refractive index less than that of the core glass layer.

7. A method as claimed in claim 5, wherein, after the step of the production of the set of localised regions of raised refractive index, and before the step of selectively removing areas of the core glass layer to produce the waveguiding structure, there is included the step of forming a further layer of core glass on the already existing layer of core glass, and wherein the step of selectively removing areas of the core glass layer to produce the strip waveguiding structure is a step that involves the selective removal of areas of both said already existing core glass layer and said further glass layer.

8. A method as claimed in claim 7, wherein, after the step of selectively removing said areas of the core glass layers, there is included the step of covering the remaining region of the core glass layers that contains the set of localised regions of raised refractive index with a further layer of cladding glass possessing a refractive index less than that of the core glass layers.

* * * * *